United States Patent [19]
Maruyama et al.

[11] Patent Number: 6,136,133
[45] Date of Patent: Oct. 24, 2000

[54] METHOD OF PRODUCING OPTICAL DISC OF BONDED TYPE

[75] Inventors: Haruhisa Maruyama; Jiro Fujimori; Masaaki Motokawa, all of Nakakoma-gun, Japan

[73] Assignees: Pioneer Electronic Corporation, Tokyo; Pioneer Video Corporation, Yamanashi-ken, both of Japan

[21] Appl. No.: 09/212,562

[22] Filed: Dec. 16, 1998

[30] Foreign Application Priority Data

Dec. 17, 1997 [JP] Japan ................................. 9-363945

[51] Int. Cl.⁷ ........................... B32B 31/12; B32B 31/28
[52] U.S. Cl. ..................... 156/273.5; 156/275.5
[58] Field of Search ............... 156/99, 106, 272.2, 156/273.3, 273.5, 273.7, 275.5; 369/275.1, 283

[56] References Cited

U.S. PATENT DOCUMENTS

| | | | |
|---|---|---|---|
| 5,171,392 | 12/1992 | Iida et al. | 156/273.3 |
| 5,744,193 | 4/1998 | Kitano | 427/162 |
| 5,759,332 | 6/1998 | Itoigawa et al. | 156/273.5 |
| 5,779,855 | 7/1998 | Amo et al. | 156/379.6 |
| 5,785,793 | 7/1998 | Arai et al. | 156/272.2 |
| 5,828,648 | 10/1998 | Takasu et al. | 369/275.1 |
| 5,951,806 | 9/1999 | Amo et al. | 156/273.5 |
| 5,961,777 | 10/1999 | Kakinuma | 156/380.9 |

*Primary Examiner*—Michael W. Ball
*Assistant Examiner*—John T. Haran
*Attorney, Agent, or Firm*—Nixon & Vanderhye

[57] ABSTRACT

A method of producing an optical disc of bonded type includes the processes of: (A) forming a first reflection film, which is half transparent for partially reflecting and partially transmitting an incident light, on a first information record surface of a first transparent substrate; (B) forming a second reflection film, which has a reflective index higher than that of the first reflection film, on a second information record surface of a second transparent substrate; (C) dripping a liquid resin of ultraviolet hardening type onto one of the first and second reflection films by a spin coating method to form a first resin layer in a non-hardened condition; (D) dripping a liquid resin of ultraviolet hardening type onto the other of the first and second reflection films by a spin coating method; (E) emitting ultraviolet onto the liquid resin dripped by the process (D) to form a second resin layer of ultraviolet hardening type in a hardened condition; (F) provisionally bonding the first and second transparent substrates together in a pressure reduced environment; and (G) hardening the first resin layer by emitting ultraviolet from a side of the first transparent substrate.

9 Claims, 2 Drawing Sheets

METHOD OF PRODUCING OPTICAL DISC OF BONDED TYPE

BACKGROUND OF THE INVENTION

1. Field of the Invention

The present invention relates to a method of producing an optical disc of bonded type.

2. Description of the Related Art

An optical disc of bonded type such as a conventional optical video disc is produced by bonding a first substrate having a first information record surface and a second substrate having a second information record surface together by an adhesive or bonding agent, from which an information signal on the first information record surface is read by emitting a laser beam thereto through the first substrate and an information signal on the second information record surface is read by emitting a laser beam thereto through the second substrate. In case of, after reading one of the information record surfaces, reading the other of the information record surfaces, the optical disc is inverted or the optical head is moved to a side of the optical disc facing the other of the information record surfaces.

Therefore, there is an optical disc of bonded type, in which one of the information record surfaces is half transparent (half reflective) to partially reflect and partially transmit the laser beam incident thereto, and an intermediate layer between the information record surfaces is transparent, so that both of the information record surfaces can be reproduced by emitting the laser beam from just one side of the optical disc.

As a method of producing such an optical disc of bonded type, there is one method of coating a liquid resin of ultraviolet hardening type on the information record surface of one of the substrates, overlapping the substrates to each other and rotating the overlapped substrates so as to fill the space between the substrates with the liquid resin of ultraviolet hardening type, and then emitting the ultraviolet light thereto so as to bond the substrates together. There is another method of bonding the substrates by use of a transparent adhesive or bonding sheet.

However, in case of the former method, there is a problem that air bubbles are easily entrapped in the intermediate layer and it is difficult to uniform the thickness of the intermediate layer. In case of the latter method, although it is relatively easy to uniform the thickness of the intermediate layer, there is a problem that it is difficult to process the sheet in line with the size of the inner and outer diameters of the disc and the cost is rather high.

SUMMARY OF THE INVENTION

The present invention is proposed in view of the above mentioned problems. It is therefore an object of the present invention to provide a method of efficiently producing an optical disc of bonded type, whose reliability is improved, with a low cost.

The above object of the present invention can be achieved by a method of producing an optical disc of bonded type. The producing method includes the processes of: (A) forming a first reflection film, which is half transparent for partially reflecting and partially transmitting an incident light, on a first information record surface of a first transparent substrate; (B) forming a second reflection film, which has a reflective index higher than that of the first reflection film, on a second information record surface of a second transparent substrate; (C) dripping a liquid resin of ultraviolet hardening type onto one of the first and second reflection films by a spin coating method to form a first resin layer of ultraviolet hardening type in a non-hardened condition on one of the first and second reflection films; (D) dripping a liquid resin of ultraviolet hardening type onto the other of the first and second reflection films by a spin coating method; (E) emitting ultraviolet onto the liquid resin dripped by the process (D) to form a second resin layer of ultraviolet hardening type in a hardened condition on the other of the first and second reflection films; (F) provisionally bonding the first and second transparent substrates together by pressing the first and second transparent substrates onto each other in such a condition that the first and second resin layers are opposed to each other in a pressure reduced environment; and (G) hardening the first resin layer by emitting ultraviolet from a side of the first transparent substrate in a condition that the first and second transparent substrates are provisionally bonded together.

According to the producing method of the present invention, since an intermediate layer between the first and second information record surfaces of the optical disc of bonded type comprises a plurality of resin layers i.e., the first and second resin layers which are formed by the spin coating method, it is possible to efficiently obtain the intermediate later having a uniform and constant thickness with a low cost.

At the same time, since the provisionally bonding process (F) is performed in the pressure reduced environment, the air bubbles are prevented from entrapping into the intermediate layer i.e., the first resin layer in the non-hardened condition. Therefore, it is possible to prevent the defectiveness in the appearance of the optical disc and the defectiveness in the bonding process due to the entrapped air bubbles.

Further, it is possible to form the first and second resin layers as the adjusting layers for adjusting the thickness of the intermediate layer and as the protecting layers for protecting the first and second reflection films respectively.

In one aspect of the producing method, the producing method further includes the processes of: (H) dripping a liquid resin of ultraviolet hardening type onto one of the first and second reflection films by a spin coating method; (I) emitting ultraviolet onto the liquid resin dripped by the process (H) before the process (C) to form a first protection layer; (J) dripping a liquid resin of ultraviolet hardening type onto the other of the first and second reflection films by a spin coating method; and (K) emitting ultraviolet onto the liquid resin dripped by the process (J) before the process (D) to form a second protection layer.

According to this aspect, it is possible to form the first and second resin layers as the adjusting layers for adjusting the thickness of the intermediate layer and to form the first and second protection layers as the protecting layer for protecting the first and second reflection films respectively.

In this aspect of forming the first and second protection layers, the liquid resin used in each of the processes (C) and (D) may have a surface tension lower than that used in each of the processes (H) and (J). Thus, it is possible to improve the functions of the first and second resin layers as the adjusting layers for adjusting the thickness of the intermediate layer.

In another aspect of the producing method, the liquid resin used in each of the processes (C) and (D) has a viscosity in a range from 15 to 70 cps at a room temperature.

According to this aspect, it is possible to improve the functions of the first and second resin layers as the adjusting layers as well as the protecting layers. In the aspect of forming the first and second protection layers, the liquid resin used in each of the processes (C), (D), (H) and (J) may have a viscosity in a range from 15 to 70 cps at a room temperature. Thus, it is possible to improve the functions of the first and second resin layers as the adjusting layers and the functions of the first and second protection layers respectively.

In another aspect of the producing method, in the process (F), a pressure in the pressure reduced environment is not higher than 50 pa (pascal).

According to this aspect, since the provisionally bonding process (F) is performed at the pressure of not higher than 50 pa, the air bubbles are certainly prevented from entrapping into the first resin layer in the non-hardened condition.

In another aspect of the producing method, the process (G) is performed at a predetermined pressure higher than that in the pressure reduced environment in the process (F).

According to this aspect, the predetermined pressure in the process (G) is higher than that of the reduced pressure environment in the process (F). Therefore, while the first resin layer in the non-hardened condition is being hardened by the emission of the ultraviolet, the air bubbles in the first resin layer is collapsed in size by virtue of the pressure difference such that the optical influence of the air bubbles can be ignored.

In this aspect, the predetermined pressure may be not higher than an atmospheric pressure. Thus, the predetermined pressure can be easily and quickly reached just by increasing the pressure from the pressure in the pressure reduced environment to the atmospheric pressure.

In this case, the process (F) may be performed in a vacuum chamber, and the process (G) may be performed in the vacuum chamber after leaking a pressure of the vacuum chamber. Thus, the predetermined pressure can be easily and quickly reached just by leaking the pressure of the vacuum chamber.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

Figure 1:
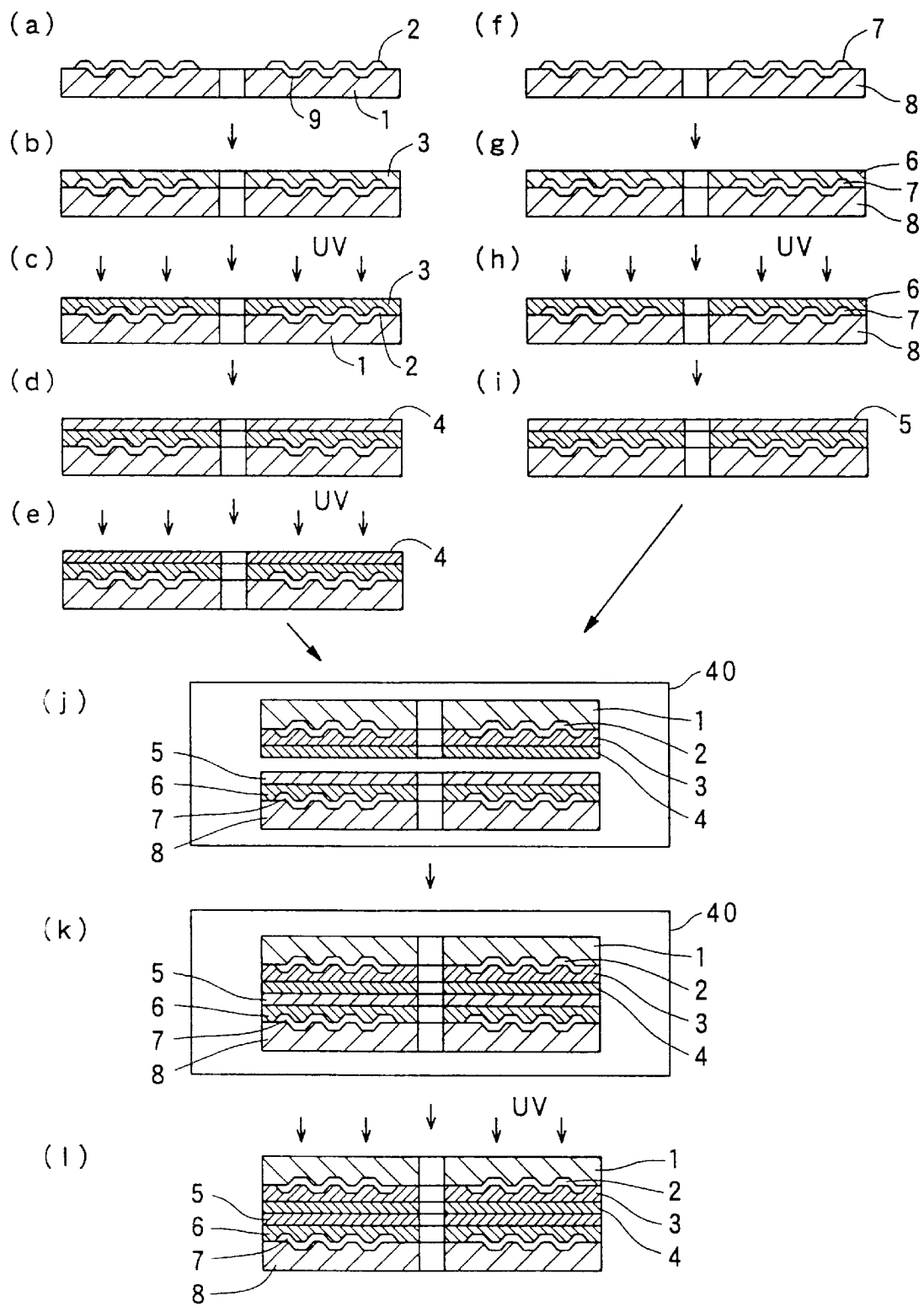
FIG. 1 is a process diagram showing a method of producing an optical disc as one embodiment of the present invention.

FIG. 1 is a process diagram showing a first embodiment of a producing method of the present invention.

In this producing method, at first, a first transparent substrate 1, on one surface of which a pit 9 for carrying a first information signal is formed, and a second transparent substrate 8, on one surface of which the pit 9 for carrying a second information signal is formed, are prepared by injection-molding a transparent resin such as polycarbonate (PC) by use of a metal mold in a cavity of which a stamper is disposed.

The material of the first and second transparent substrates 1 and 8 may be a material having a light transmissivity e.g., a transparent resin such as polycarbonate, polymethylmethacrylate (PMMA) or the like, or a transparent material such as an optical glass. Among those transparent material, the polycarbonate is excellent in the environment-proof property and in the size stability, and is preferably used.

In case that the first and second transparent substrates 1 and 8 are made of the resin, they are integrally molded by injection-molding process by use of the metal mold in the cavity of which the stamper is disposed, and the pit 9 is also simultaneously formed on each of the surfaces thereof.

The shape and size of the first and second transparent substrates 1 and 8 are determined appropriately in accordance with the usage of the pertinent optical disc. For example, in case of the DVD, each of the first and second transparent substrates 1 and 8 is a disc shaped substrate, whose diameter is about 120 mm, which has a center hole with a diameter of 15 mm at a center thereof, and whose thickness is about 0.6 mm.

Next, as shown in a step (a) of FIG. 1, a half-transparent (half-reflective) first reflection film 2 for partially reflecting an incident light and partially transmitting the incident light is formed on the first information record surface of the first transparent substrate 1 where the pit 9 is formed. Here, the first reflection film 2 is formed by a spattering method or the like except for the inner and outer circumferential non-recordable portions.

The first reflection film 2 having the half transparent property may be made of a metal reflection film which is thinner than an ordinary reflection film, for example. More concretely, the first reflection film 2 may be made of a metal thin film of Au (gold), Ag (silver), Ni (nickel), Al (aluminum) or the like whose thickness is about 100 to 200 Å (angstroms), or a dielectric thin film such as a film of silicon carbide, a film of silicon nitride or the like. As a forming method of the first reflection film 2, there may be employed a spattering method, a vacuum deposition method, an ion plating method and so on.

Next, as shown in a step (b) of FIG. 1, a liquid resin of ultraviolet hardening type is dripped on the first reflection film 2, so that a first protection layer 3 made of the resin of ultraviolet hardening type in a non-hardened condition is coated thereon, which has a thickness of about 10 to 20 $\mu$m in the non-hardened condition, by a spin coating method.

As the liquid resin of ultraviolet hardening type used for the formation of the first protection layer 3, a resin whose viscosity is in a range of about 15 to 70 cps in the non-hardened condition at a room temperature and whose surface tension is about 45 dyn/cm$^2$ may be preferably employed. For example, a resin of ultraviolet hardening type "SK-5110", "SK-3100" (trade name) made by a SONY CHEMICAL corporation may be employed here.

Next, as shown in a step (c) of FIG. 1, an ultraviolet beam (UV) is emitted onto the first protection layer 3 in the non-hardened condition, so as to harden the resin of ultraviolet hardening type constituting the first protection layer 3.

Next, as shown in a step (d) of FIG. 1, a liquid resin of ultraviolet hardening type is dripped on the first protection layer 3 which has been ultraviolet-hardened, so that a first resin layer 4 of ultraviolet hardening type in a non-hardened condition is coated thereon, which has a thickness of about 5 to 15 $\mu$m in the non-hardened condition, by a spin coating method.

As the liquid resin of ultraviolet hardening type used for the formation of the first resin layer 4, a resin whose viscosity is in a range of about 15 to 70 cps in the non-hardened condition at a room temperature and whose surface tension is about 30 dyn/cm², which is lower than that of the first protection layer 3, may be preferably employed. For example, a resin of ultraviolet hardening type "SK-3100" (trade name) made by a SONY CHEMICAL corporation may be employed here.

Next, as shown in a step (e) of FIG. 1, an ultraviolet beam (UV) is emitted onto the first resin layer 4 in the non-hardened condition, so as to harden the resin of ultraviolet hardening type constituting the first resin layer 4.

As described above, a semi-finished product of the optical disc is obtained, in which the first reflection film 2, the first protection layer 3 in the hardened condition and the first resin layer 4 in the hardened condition are laminated on the first transparent substrate 1.

By steps (f) to (i) of FIG. 1 performed in parallel with the steps (a) to (e) of FIG. 1, a semi-finished product of the optical disc is obtained, in which a second reflection film 7, a second protection layer 6 in the hardened condition and a second resin layer 5 in the non-hardened condition are laminated on the second transparent substrate 8.

Namely, as shown in the step (f) of FIG. 1, the second reflection film 7 for reflecting an incident light is formed on the second information record surface of the second transparent substrate 8 where the pit 9 is formed. Here, the second reflection film 7 is formed by a spattering method or the like except for the inner and outer circumferential non-recordable portions.

It is not necessary to construct the second reflection film 7 as a half-transparent film as in the case of the first reflection film 2. The second reflection film 7 may be made of Al, aluminum alloy, Au, Ag, Cu (copper) or the like. Among those materials, the aluminum and the aluminum alloy are preferable because of the high reflectivity. As a forming method of the second reflection film 7, there may be employed a spattering method, a vacuum deposition method, an ion plating method and so on. The thickness of the second reflection film 7 may be 0.05 to 0.2 μm and preferably 0.08 to 0.12 μm.

Next, as shown in the step (g) of FIG. 1, a liquid resin of ultraviolet hardening type is dripped on the second reflection film 7, so that the second protection layer 6 made of the resin of ultraviolet hardening type in a non-hardened condition is coated thereon, which has a thickness of about 10 to 20 μm in the non-hardened condition, by a spin coating method.

As the liquid resin of ultraviolet hardening type used for the formation of the second protection layer 6, a resin whose viscosity is in a range of about 15 to 70 cps in the non-hardened condition at a room temperature and whose surface tension is about 45 dyn/cm² may be preferably employed. For example, a resin of ultraviolet hardening type "SK-5110", "SK-3100" (trade name) made by a SONY CHEMICAL corporation may be employed here.

Next, as shown in the step (h) of FIG. 1, an ultraviolet beam (UV) is emitted onto the second protection layer 6 in the non-hardened condition, so as to harden the resin of ultraviolet hardening type constituting the second protection layer 6.

Next, as shown in the step (i) of FIG. 1, a liquid resin of ultraviolet hardening type is dripped on the second protection layer 6 which has been ultraviolet-hardened, so that the second resin layer 5 of ultraviolet hardening type in a non-hardened condition is coated thereon, which has a thickness of about 5 to 15 μm in the non-hardened condition, by a spin coating method.

As the liquid resin of ultraviolet hardening type used for the formation of the second resin layer 5, a resin whose viscosity is in a range of about 15 to 70 cps in the non-hardened condition at a room temperature and whose surface tension is about 30 dyn/cm², which is lower than that of the second protection layer 6, may be preferably employed. For example, a resin of ultraviolet hardening type "SK-3100" (trade name) made by a SONY CHEMICAL corporation may be employed here.

As described above, a semi-finished product of the optical disc is obtained, in which the second reflection film 7, the second protection layer 6 in the hardened condition and the second resin layer 5 in the non-hardened condition are laminated on the second transparent substrate 8.

Next, as shown in a step (j) of FIG. 1, the first transparent substrate 1, on which the first reflection film 2, the first protection layer 3 in the hardened condition and the first resin layer 4 in the hardened condition are laminated, and the second transparent substrate 8, on which the second reflection film 7, the second protection layer 6 in the hardened condition and the second resin layer 5 in the non-hardened condition are laminated, are positioned in a chamber 40 in such a condition that the second transparent substrate 8 is disposed below and that the first resin layer 4 in the hardened condition and the second resin layer 5 in the non-hardened condition are opposed to each other through a small gap therebetween. Then, the pressure in the chamber 40 is reduced down to be not higher than 50 pa (pascal).

Next, as shown in a step (k) of FIG. 1, after the pressure in the chamber 40 is reduced to be a predetermined value (i.e., not higher than 50 pa), the first and second transparent substrates 1 and 8 are pressed to each other by a pressing plate with such a pressure (i.e., a pressing force) that the resin of ultraviolet hardening type constituting the second resin layer 5 in the non-hardened condition is not forced out so as to provisionally bond the first and second transparent substrates 1 and 8. By pressing in this manner, the warp and distortion of the first and second transparent substrates 1 and 8 are cured when they are provisionally bonded together.

Next, as shown in a step (l) of FIG. 1, while the first and second transparent substrates 1 and 8 are being pressed to each other by the pressing plate, the internal space of the chamber 40 is leaked i.e., the pressure in the chamber 40 is increased to a predetermined pressure which is higher than the reduced pressure applied at the step (k) and which may be an atmospheric pressure. Then, after the pressure in the chamber 40 reaches the predetermined pressure (e.g., the atmospheric pressure), pressing by the pressing plate is released, and an ultraviolet beam (UV) is emitted from the side of the first transparent substrate 1 onto the second resin layer 5 in the non-hardened condition while the first and second transparent substrates 1 and 8 are overlapped and provisionally bonded to each other, so as to harden the resin of ultraviolet hardening type constituting the second resin layer 5.

In the above mentioned steps (k) and (l), by overlapping and provisionally bonding the first and second transparent substrates 1 and 8 in the pressure-reduced environment, it is possible to restrain the entrapment of the air bubbles into the second resin layer 5 in the non-hardened condition. Namely, only a relatively little amount of the air bubbles are generated in the second resin layer 5. Further, by virtue of the difference between the reduced pressure (e.g., not higher than 50 pa) at the step (k) and the increased pressure (e.g., higher than 50 pa or equal to the atmospheric pressure) at the step (l), the air bubbles generated at the time of bonding is collapsed in size such that the optical influence of the air bubbles can be ignored.

The optical disc of bonded type produced by the above explained steps (a) to (l) of FIG. 1 has such a structure that the first transparent substrate 1, the first reflection film 2, the first protection layer 3, the first resin layer 4, the second resin layer 5, the second protection layer 6, the second reflection film 7 and the second transparent substrate 8 are laminated in this order.

On the surface of the first transparent substrate 1 on the side of the first reflection film 2 (i.e., the first information record surface), the pit 9 for carrying the first information signal is provided so as to form a coaxial or spiral track. On the surface of the second transparent substrate 8 on the side of the second reflection film 7 (i.e., the second information record surface), the pit 9 for carrying the second information signal is provided so as to form a coaxial or spiral track. The optical disc is constructed such that both of those tracks can be read by the reproduction light beam emitted from the side of the first transparent substrate 1.

Each thickness of the first and second protection layers 3 and 6 and the first and second resin layers 4 and 5 made of the resin of ultraviolet hardening type, which are disposed as an intermediate layer between the first and second reflection films 2 and 7, is set so that the thickness of the intermediate layer becomes 40 to 70 $\mu$m and preferably becomes 50 $\mu$m, in order to condense or focus the reproduction light beam from the side of the first transparent substrate 1 through the intermediate layer onto the second information record surface (i.e., the second reflection film 7) and reproduce the information therefrom. Further, each refractive index of the first and second protection layers 3 and 6 and the first and second resin layers 4 and 5, which constitute the intermediate layer, is preferably set to 1.40 to 1.60. It is also preferable that the difference between the refractive indexes of the first and second transparent substrates 1 and 8 is not greater than 0.05.

Figure 2:
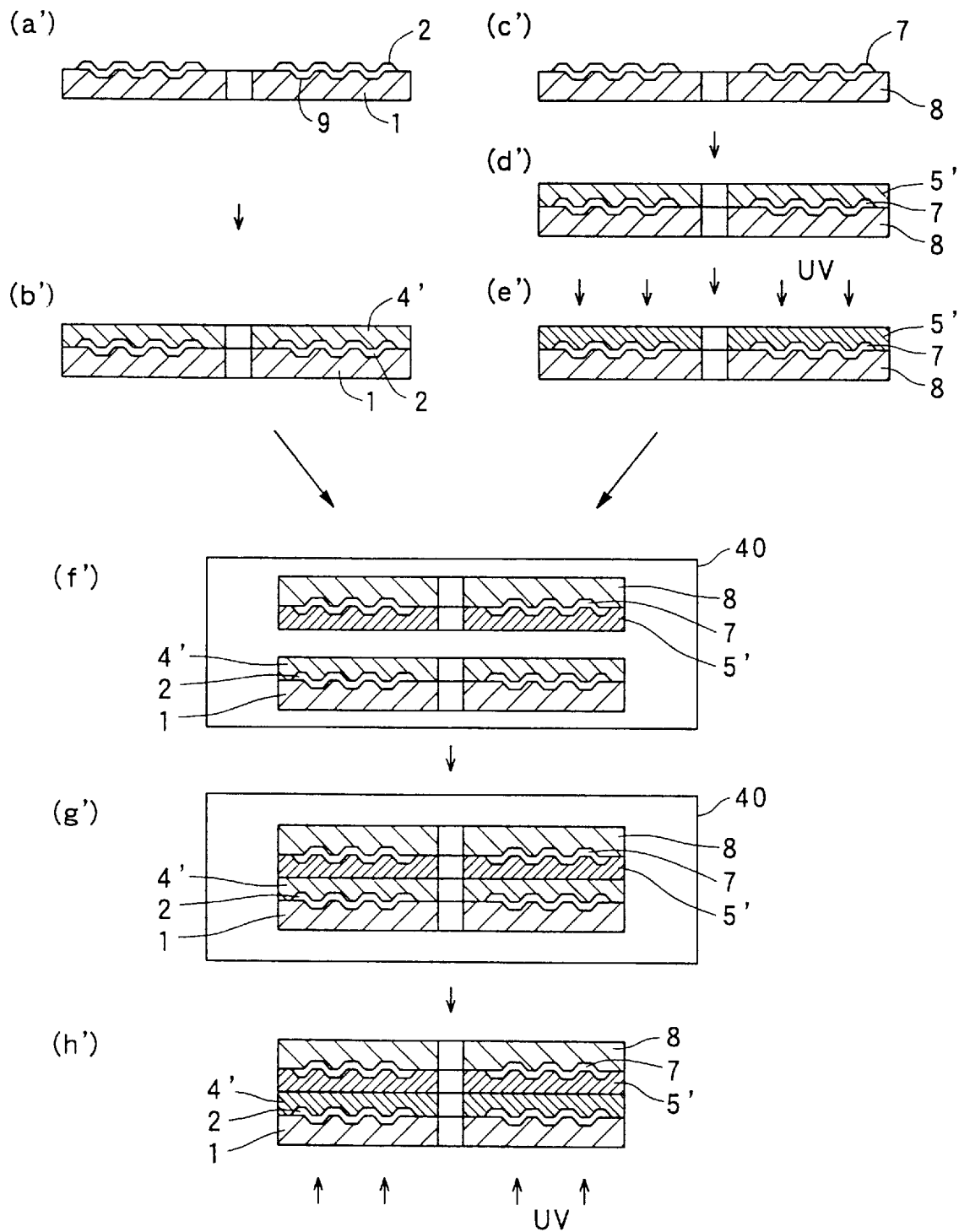
FIG. 2 is a process diagram showing a method of producing an optical disc as another embodiment of the present invention

FIG. 2 is a process diagram showing a second embodiment of a producing method of the present invention.

According to the second embodiment, the number of the steps required in the producing method can be reduced as compared with the above described first embodiment, while obtaining the advantageous effect of the present invention.

In the second embodiment, the preparation of the first and second transparent substrates 1 and 8 are the same as the first embodiment.

Next, as shown in a step (a') of FIG. 2, a half-transparent (half-reflective) first reflection film 2 for partially reflecting an incident light and partially transmitting the incident light is formed on the first information record surface of the first transparent substrate 1 where the pit 9 is formed. Here, the first reflection film 2 is formed by a spattering method or the like except for the inner and outer circumferential non-recordable portions, in the same manner as the first embodiment.

The first reflection film 2 having the half transparent property may be made of a metal thin film of Au, Ag, Ni, Al or the like whose thickness is about 100 to 200 Å, or a dielectric thin film such as a film of silicon carbide, a film of silicon nitride or the like. As a forming method of the first reflection film 2, there may be employed a spattering method, a vacuum deposition method, an ion plating method and so on, in the same manner as the first embodiment.

Next, as shown in a step (b') of FIG. 2, a liquid resin of ultraviolet hardening type is dripped on the first reflection film 2, so that a first resin layer 4' of ultraviolet hardening type in a non-hardened condition is coated thereon, which has a thickness of about 15 to 30 $\mu$m in the non-hardened condition, by a spin coating method.

As the liquid resin of ultraviolet hardening type used for the formation of the first resin layer 4', a resin whose viscosity is in a range of about 15 to 70 cps in the non-hardened condition at a room temperature and whose surface tension is about 45 dyn/cm$^2$ may be preferably employed. For example, a resin of ultraviolet hardening type "SK-5110" (trade name) made by a SONY CHEMICAL corporation may be employed here.

As described above, a semi-finished product of the optical disc is obtained, in which the first reflection film 2 and the first resin layer 4' in the non-hardened condition are laminated on the first transparent substrate 1.

By steps (c') to (e') of FIG. 2 performed in parallel with the steps (a') to (b') of FIG. 2, a semi-finished product of the optical disc is obtained, in which a second reflection film 7 and a second resin layer 5' in the hardened condition are laminated on the second transparent substrate 8.

Namely, as shown in the step (c') of FIG. 2, the second reflection film 7 for reflecting an incident light is formed on the second information record surface of the second transparent substrate 8 where the pit 9 is formed. Here, the second reflection film 7 is formed by a spattering method or the like except for the inner and outer circumferential non-recordable portions in the same manner as the first embodiment.

It is not necessary to construct the second reflection film 7 as a half-transparent film as in the case of the first reflection film 2. The second reflection film 7 may be made of Al, aluminum alloy, Au, Ag, Cu or the like. Among those materials, the aluminum and the aluminum alloy are preferable because of the high reflectivity. As a forming method of the second reflection film 7, there may be employed a spattering method, a vacuum deposition method, an ion plating method and so on, in the same manner as the first embodiment. The thickness of the second reflection film 7 may be 0.05 to 0.2 $\mu$m and preferably 0.08 to 0.12 $\mu$m.

Next, as shown in the step (d') of FIG. 2, a liquid resin of ultraviolet hardening type is dripped on the second reflection film 7, so that the second resin layer 5' of ultraviolet hardening type in a non-hardened condition is coated thereon by a spin coating method.

As the liquid resin of ultraviolet hardening type used for the formation of the second resin layer 5', a resin whose viscosity is in a range of about 15 to 70 cps in the non-hardened condition at a room temperature and whose surface tension is about 45 dyn/cm$^2$ may be preferably employed. For example, a resin of ultraviolet hardening type "SK-5110" or "SK-3200" (trade name) made by a SONY CHEMICAL corporation may be employed here.

Next, as shown in a step (e') of FIG. 2, an ultraviolet beam (UV) is emitted onto the second resin layer 5' in the non-hardened condition, so as to harden the resin of ultraviolet hardening type constituting the second resin layer 5', such that the second resin layer 5' has a thickness of about 15 to 40 $\mu$m in the hardened condition, As described above, a semi-finished product of the optical disc is obtained, in which the second reflection film 7 and the second resin layer 5' in the hardened condition are laminated on the second transparent substrate 8.

Next, as shown in a step (f') of FIG. 2, the first transparent substrate 1, on which the first reflection film 2 and the first resin layer 4' in the non-hardened condition are laminated, and the second transparent substrate 8, on which the second reflection film 7 and the second resin layer 5' in the hardened condition are laminated, are positioned in a chamber 40 in such a condition that the first transparent substrate 1 is disposed below and that the first resin layer 4' in the non-hardened condition and the second resin layer 5' in the hardened condition are opposed to each other through a small gap therebetween. Then, the pressure in the chamber 40 is reduced down to be not higher than 50 pa (pascal).

Next, as shown in a step (g') of FIG. 2, after the pressure in the chamber 40 is reduced to be a predetermined value, the first and second transparent substrates 1 and 8 are pressed to each other by such a pressure that the resin of ultraviolet hardening type constituting the first resin layer 4' in the non-hardened condition is not forced out so as to provisionally bond the first and second transparent substrates 1 and 8.

Next, as shown in a step (h') of FIG. 2, after the internal space of the chamber 40 is leaked i.e., the pressure in the chamber 40 is increased to a predetermined pressure which is higher than the reduced pressure applied at the step (g') and which may be an atmospheric pressure, an ultraviolet beam (UV) is emitted from the side of the first transparent substrate 1 onto the first resin layer 4' in the non-hardened condition while the first and second transparent substrates 1 and 8 are overlapped and provisionally bonded to each other, so as to harden the resin of ultraviolet hardening type constituting the first resin layer 4'. By virtue of the difference between the reduced pressure (e.g., not higher than 50 pa) at the step (g') and the increased pressure (e.g., higher than 50 pa or equal to the atmospheric pressure) at the step (h'), the air bubbles generated at the time of bonding is collapsed in size such that the optical influence of the air bubbles can be ignored.

The optical disc of bonded type produced by the above explained steps (a') to (h') of FIG. 2 has such a structure that the first transparent substrate 1, the first reflection film 2, the first resin layer 4', the second resin layer 5', the second reflection film 7 and the second transparent substrate 8 are laminated in this order.

On the surface of the first transparent substrate 1 on the side of the first reflection film 2 (i.e., the first information record surface), the pit 9 for carrying the first information signal is provided so as to form a coaxial or spiral track. On the surface of the second transparent substrate 8 on the side of the second reflection film 7 (i.e., the second information record surface), the pit 9 for carrying the second information signal is provided so as to form a coaxial or spiral track. The optical disc is constructed such that both of those tracks can be read by the reproduction light beam emitted from the side of the first transparent substrate 1.

Each thickness of the first and second resin layers 4' and 5' made of the resin of ultraviolet hardening type, which are disposed as an intermediate layer between the first and second reflection films 2 and 7, is set so that the thickness of the intermediate layer becomes 40 to 70 μm and preferably becomes 50 μm, in order to condense or focus the reproduction light beam from the side of the first transparent substrate 1 through the intermediate layer onto the second information record surface (i.e., the second reflection film 7) and reproduce the information therefrom. Further, each refractive index of the first and second resin layers 4' and 5', which constitute the intermediate layer, is preferably set to 1.40 to 1.60. It is also preferable that the difference between the refractive indexes of the first and second transparent substrates 1 and 8 is not greater than 0.05.

Furthermore, the first and second resin layers 4' and 5' in the second embodiment also have functions as the aforementioned first and second protection layers 3 and 6 respectively in the first embodiment.

As described above in detail, according to each of the first and second embodiments of the producing method of the present invention, since the intermediate layer is formed by use of a plurality of resin layers of ultraviolet hardening type formed by a spin-coat method, it is possible to efficiently obtain the intermediate layer whose thickness is uniform and constant in a predetermined value with a low cost. Since the bonding process is performed by provisionally bonding the substrates in the pressure reduced environment (e.g., at a pressure P1 not higher than 50 pa) and then hardening the resin of the ultraviolet hardening type as the adhesive or bonding agent at a pressure P2 (P2>P1) such as the atmospheric pressure, it is possible to collapse the air bubbles into fine pieces and efficiently prevent the harmful air bubbles from entrapping into the intermediate layer i.e., the second resin layer 5 (in the first embodiment) or the first resin layer 4' (in the second embodiment) of ultraviolet hardening type. Therefore, it is possible to prevent the defectiveness in the appearance of the optical disc and the defectiveness in the bonding process due to the entrapped air bubbles.

Especially, according to the first embodiment, each of the first and second protection layers 3 and 6 has a function of protecting the first and second information record surfaces respectively while each of the first and second resin layers 4 and 5 has a function as an adjusting layer for adjusting the thickness of the intermediate layer and also as a bonding or adhering layer for bonding the substrates together.

According to the second embodiment, the number of the steps required in the producing method can be reduced and the structure of the laminated layers of the optical disc can be simplified.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.09-363945 filed on Dec. 17, 1997 including the specification, claims, drawings and summary is incorporated herein by reference in its entirety.

What is claimed is:

1. A method of producing a bonded optical disc comprising the steps of:

(A) forming a first reflection film, which is half transparent for partially reflecting and partially transmitting incident light, on a first information record surface of a first transparent substrate;

(B) forming a second reflection film, which has a reflective index higher than that of the first reflection film, on a second information record surface of a second transparent substrate;

(C) applying an ultraviolet hardening liquid resin onto one of the first and second reflection films by spin coating to form a first ultraviolet hardening resin layer in a non-hardened condition on said one of the first and second reflection films;

(D) applying an ultraviolet hardening liquid resin onto the other of the first and second reflection films by spin coating;

(E) emitting ultraviolet radiation onto the liquid resin applied in step (D) to form a second ultraviolet hardening resin layer in a hardened condition on the other of the first and second reflection films;

(F) pressing the first and second transparent substrates onto each other in a reduced pressure environment such that the first and second resin layers are opposed to each other; and (G) then hardening the entire first resin layer by emitting ultraviolet radiation from the side of the first transparent substrate opposite the first resin layer such that the first and second transparent substrates are bonded together.

2. A method according to claim 1, comprising the additional steps of:

(H) applying an ultraviolet hardening liquid resin onto one of the first and second reflection films by spin coating;

(I) emitting ultraviolet radiation onto the liquid resin applied by step (H) to form a first protection layer after step (H) and before step (C);

(J) applying an ultraviolet hardening liquid resin onto the other of the first and second reflection films by spin coating; and (K) emitting ultraviolet radiation onto the liquid resin applied by step (J) to form a second protection layer after step (J) and before step (D).

3. A method according to claim 2, wherein the liquid resin used in each of steps (C) and (D) has a surface tension lower than that used in each of steps (H) and (J).

4. A method according to claim 1, wherein the liquid resin used in each of steps (C) and (D) has a viscosity in a range from 15 to 70 cps at a room temperature.

5. A method according to claim 2, wherein the liquid resin used in each of steps (C), (D), (H) and (J) has a viscosity in a range from 15 to 70 cps at a room temperature.

6. A method according to claim 1, wherein, in step (F), a pressure in the pressure reduced environment is not higher than 50 pa (pascal).

7. A method according to claim 1, wherein the process (G) is performed at a predetermined pressure higher than that in the pressure reduced environment in the process (F).

8. A method according to claim 7, wherein the predetermined pressure is not higher than an atmospheric pressure.

9. A method according to claim 8, wherein step (F) is performed in a vacuum chamber, and step (G) is performed in a vacuum chamber after the pressure of the vacuum chamber is increased.

* * * * *